July 18, 1967
H. P. PETERS
3,331,646
PAN SUPPORT STRUCTURE
Filed Nov. 4, 1965
3 Sheets-Sheet 1
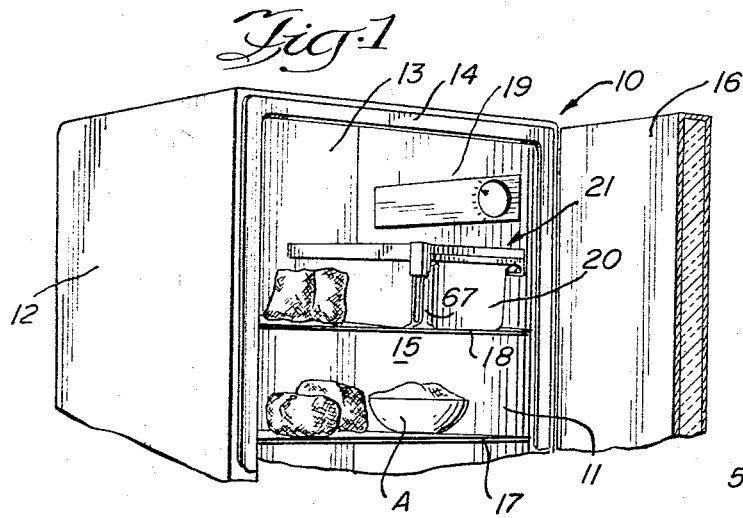
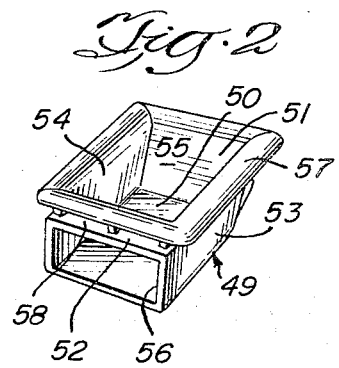
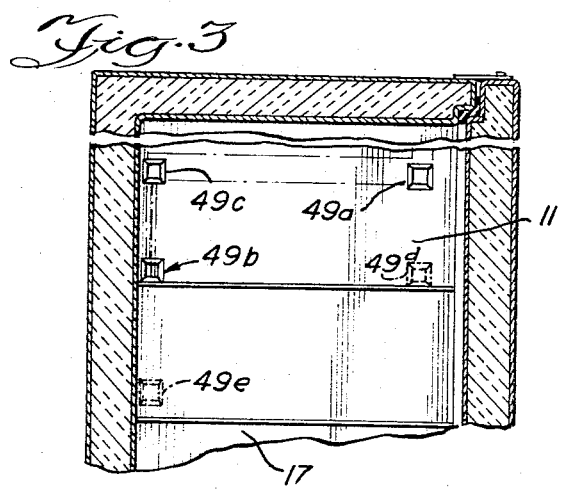
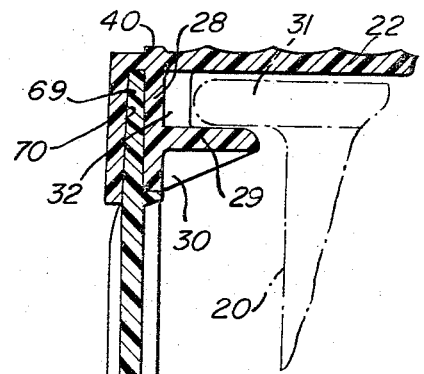
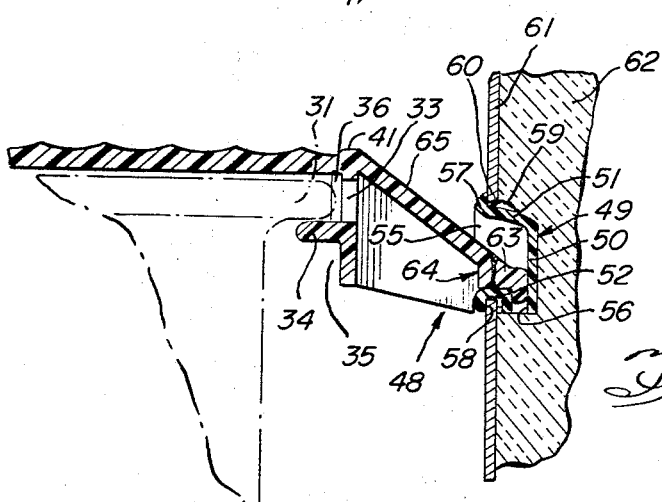
Inventor
Harold P. Peters
By Hofgren, Wegner, Allen, Stellman & McCord
Attorneys July 18, 1967         H. P. PETERS         3,331,646
PAN SUPPORT STRUCTURE
Filed Nov. 4, 1965         3 Sheets-Sheet 2
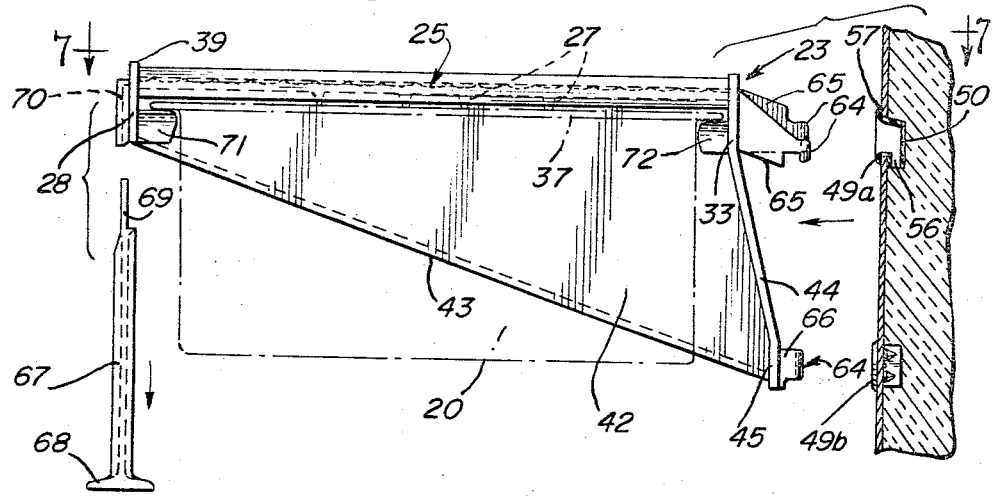
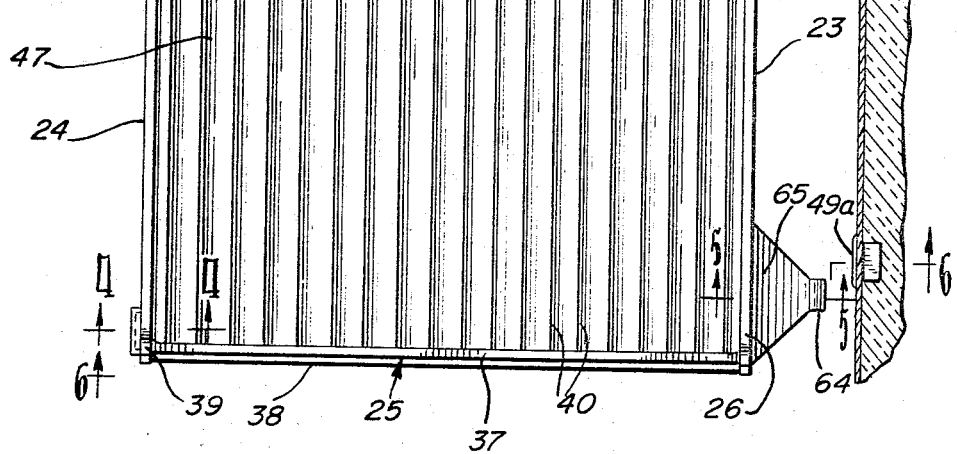

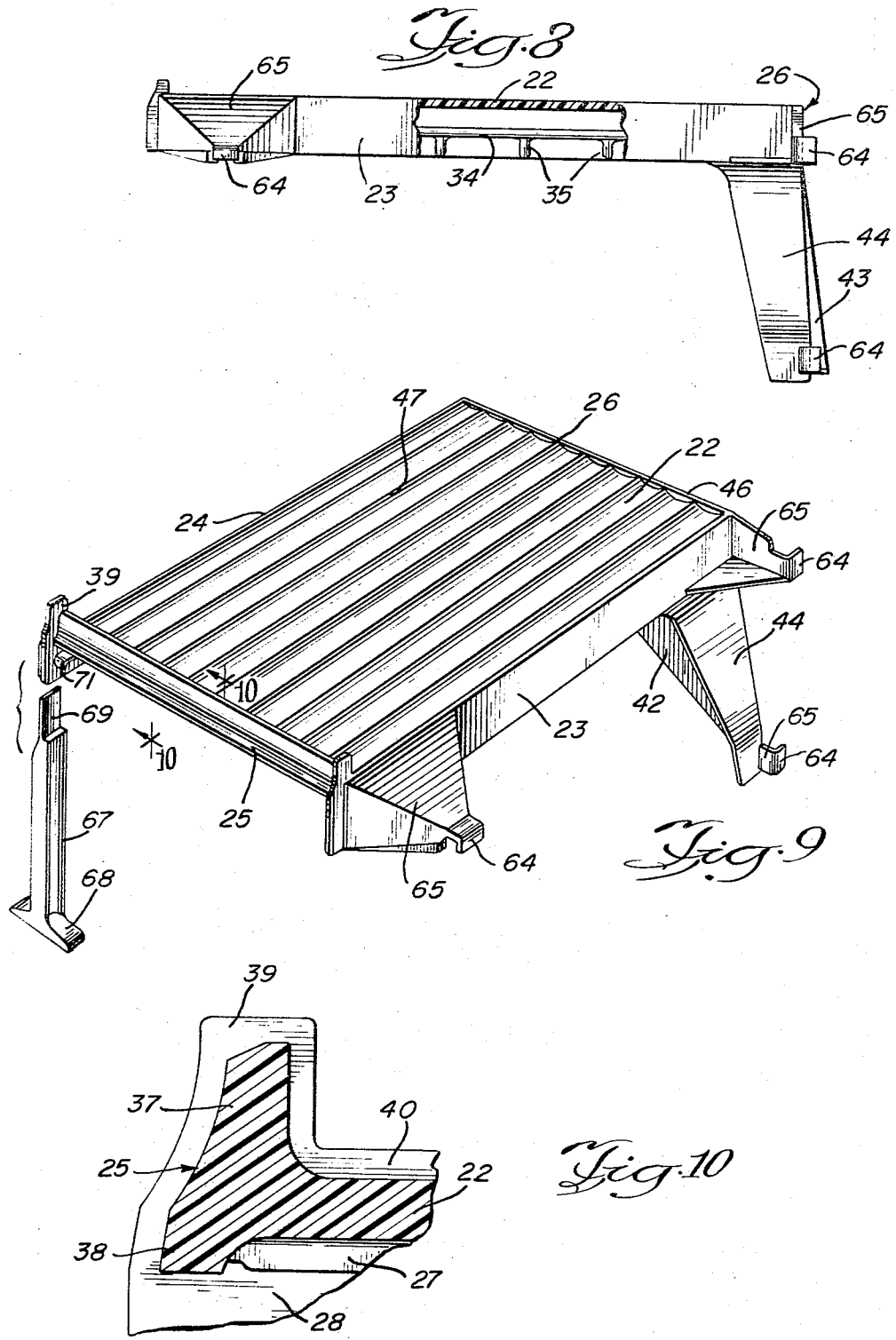

ent Office 3,331,646
Patented July 18, 1967

3,331,646
PAN SUPPORT STRUCTURE
Harold P. Peters, Evansville, Ind., assignor to Whirlpool Corporation, a corporation of Delaware
Filed Nov. 4, 1965, Ser. No. 506,328
10 Claims. (Cl. 312—270)

ABSTRACT OF THE DISCLOSURE

A pan supporting cover and shelf structure for use in a refrigerator or the like, having connector means for connecting the shelf to an upright wall of the refrigerator, and a web-like flange for supporting the shelf at a position spaced from the wall, the flange extending between one of the connector means and the spaced position on the shelf, and a further support for the shelf at a position spaced from the wall and from the flange.

---

This invention relates to support structures and in particular to structures for removably supporting and covering a receptacle.

In one conventional form of refrigerator structure, a meat pan is provided which is removably installed within the refrigerated compartment for facilitated use of the meat pan. The present invention comprehends an improved structure for supporting a receptacle such as a meat pan which is extremely simple and economical of construction, while yet providing improved removable support and covering of the meat pan.

Thus, a principal feature of the present invention is the provision of a new and improved structure for removably supporting and covering a pan.

Another feature of the invention is the provision of such a structure having new and improved means for mounting the cover in a cantilever fashion.

A further feature of the invention is the provision of such a structure wherein the mounting means comprises new and improved hook and socket cooperating connecting means.

Still another feature of the invention is the provision of such a structure wherein a plurality of socket means are provided in spaced vertical coplanar relationship and arranged in a novel manner to lock cooperating hook means thereinto in the installed arrangement of the structure.

A further feature of the invention is the provision of such a structure including a cover having a side edge and means for removably carrying a subjacent pan, means defining a plurality of connectors including first connecting means fixedly spaced apart substantially in a common vertical plane, second connecting means on the cover spaced apart at the edge removably engaging corresponding first connecting means, and third connecting means spaced from the cover and substantially in a plane defined by the edge removably engaging corresponding first connecting means, means connecting the third connecting means to the cover at a first position spaced substantially from the edge for supporting the cover at the position, and means connected to the cover at a second position spaced substantially from the edge and first position for supporting the cover at the second position.

Other features and advantages of the invention will be apparent from the following description when taken in connection with the accompanying drawings wherein:

FIGURE 1 is a fragmentary perspective view of a refrigerator provided with structure embodying the invention;

FIGURE 2 is a perspective view of a socket element of the structure;

FIGURE 3 is a fragmentary vertical section of the refrigerator illustrating the arrangement of the socket elements on the side wall of the refrigerator;

FIGURE 4 is a fragmentary enlarged vertical section taken substantially along the line 4—4 of FIGURE 7;

FIGURE 5 is a fragmentary vertical section taken substantially along the line 5—5 of FIGURE 7, but with the hook element of the connecting means received in the socket element on the refrigerator side wall;

FIGURE 6 is a vertical section taken substantially along the line 6—6 of FIGURE 7;

FIGURE 7 is a fragmentary horizontal section taken substantially along the line 7—7 of FIGURE 6;

FIGURE 8 is a right side elevation of the structure with a portion broken away to facilitate illustration thereof;

FIGURE 9 is an isometric view of the structure with the outboard support spaced therefrom; and FIGURE 10 is a fragmentary enlarged vertical section taken substantially along the line 10—10 of FIGURE 9.

In the exemplary embodiment of the invention as disclosed in the drawing, a cabinet generally designated 10 is shown to comprise a conventional refrigerator cabinet having a right side wall 11, a left side wall 12, a rear wall 13 and a top wall 14 cooperatively defining a chamber 15 selectively closeable by means of a conventional door 16. A plurality of vertically spaced shelves 17 and 18 may be provided within the chamber 15 in the conventional manner for carrying articles A to be refrigerated. A control 19 may be provided in the chamber 15 for controlling the operation of the refrigerator.

As indicated briefly above, in such refrigerators it is conventional to provide a receptacle for holding meat and the like. Herein, the receptacle comprises a meat pan 20 which is removably supported and covered by a supporting and covering structure generally designated 21 whereby the meat pan may be readily installed in the chamber 15 and removed therefrom as desired.

The structure 21 comprises a generally horizontal cover portion 22 having a right side edge 23, a left side edge 24, a front portion 25 and a rear portion 26, as best seen in FIGURE 9. The cover may be centrally reinforced by suitable depending ribs 27 extending between the front portion 25 and rear portion 26. Left side edge portion 24 comprises a depending flange 28 provided with an inturned ledge 29 reinforced by a plurality of spaced triangular gussets 30 to define a slide on which an outturned edge 31 of the meat pan 20 slidably rests, the ledge 29 being spaced below the cover portion 22 to provide free movement of the pan edge 31 therebetween. The flange 28 may be reinforced by a plurality of spaced vertical webs 32, as shown in FIGURE 4.

The right side edge portion 23, as shown in FIGURE 5, is similarly defined by a depending flange 33 provided with an inturned ledge 34 reinforced by a plurality of triangular gussets 35 and a plurality of webs 36 for rigidifying the flange 33, thereby to provide a right slide support for the outturned flange 31 of the meat pan 20. The forward end of ledge 29 may be downcurved as at 71 (see FIGURES 6 and 9), and the forward end of the ledge 34 may be similarly downturned at 72 (see FIGURE 6) to guide the meat pan edge 31 onto the ledges 29 and 34, respectively, during insertion thereof.

The front edge portion 25 of the cover is defined by an upturned wall 37 and a downturned wall 38. The flange 28 is provided with an enlarged front end portion 39 having a shape generally similar to the cross-section of the front edge portion 25, but slightly larger as seen in FIGURE 10. Further, as shown in FIGURE 10, the flange 28 may include a small upstanding ridge portion 40 projecting to above the level of the cover portion 22.

As seen in FIGURE 5, the right side edge flange 33 is similarly provided with a small upstanding ridge portion 41.

The rear portion 26 includes a depending flange 42 having a lower rearwardly turned edge 43 which extends angularly downwardly from the left side edge flange 28 to substantially below the right side edge portion 23, as shown in FIGURE 6. A bracket portion 44 depends from the right side wall flange 33 at the rear portion 26 to define the right-hand edge of the depending flange 42. As best seen in FIGURE 6, the bracket portion 44 extends angularly downwardly to the right from the right side edge flange 33 and includes a lower vertical portion 45 spaced below and to the right of the right side edge flange 33. The rear portion 26 includes a small upstanding ridge portion 46 similar to ridge portions 40 and 41 of the left and right side edges, respectively. As shown in FIGURE 9, the upper surface 47 of the cover 22 may be suitably fluted.

The cover 22 is mounted in the refrigerator chamber 15 by suitable connectors generally designated 48. Herein the connectors 48 include a plurality of socket elements 49 mounted in the right side wall 11 of the refrigerator cabinet 10 in a generally coplanar spaced relationship, as shown in FIGURE 3. As illustrated in FIGURE 2, each socket element 49 comprises a rear wall 50, a first end wall 51, an opposite end wall 52, a first side wall 53, and an opposite side wall 54 cooperatively defining an opening 55. The end wall 52 is provided with an opening 56 therethrough and the socket element is provided with a flange 57 extending peripherally outwardly to define with the end wall 52 a groove 58, and with a plurality of tabs 59 on the end wall 51 an effective catch 60 (see FIGURE 5). The refrigerator side wall 11 includes a liner 61 and suitable insulation 62 therebehind. The liner is provided with a plurality of suitable openings 63 through which the socket elements 49 may be installed to receive the upper and lower edges of the opening 63 in the groove 58 and effective catch 60, respectively, of the socket elements. The flange 57, as shown in FIGURE 5, overlies the edge of the opening 63 to limit the insertion of the socket element and provide a decorative overlying trim.

The socket elements may be individually located on the refrigerator side wall 11 so as to permit the mounting of the pan supporting and covering structure in any suitable position in the chamber 15 as desired. As indicated briefly above, the structure 21 is arranged to support the pan 20 above the shelf 18 and below control 19, with the rear of the pan closely adjacent the rear wall 13 of the refrigerator cabinet. For this purpose, the socket elements are installed in the arrangement illustrated in FIGURE 3.

The connectors 48, as shown in FIGURE 5, further include a connecting means 64 comprising a turned hook adapted to extend through the opening 55 of the socket element and thence into the opening 56. The connector hook 64 is joined to the cover by a suitable arm 65 so that when the hook connector 64 is secured to the socket element the flange 33 of the right side edge is spaced from the side wall 11 of the refrigerator cabinet. As the lower portion 45 of the bracket portion 44 is spaced to the right of the vertical plane of flange 33, as shown in FIGURE 6, the arm 66 of the connector 64 mounted at the lower right-hand edge of flange 42 is made substantially shorter than the arm 65 of the upper connector hooks 64 thereby to position each of the connector hooks 64 substantially in a common vertical plane.

To provide an improved locked association of the connectors 48, the socket element 49a is arranged to have the opening 56 thereof at the lower end when installed in the cabinet wall 11 whereas the rear socket elements 49b and 49c are arranged to have the openings 56 thereof at the rearward end of the socket element when so installed. Thus, as shown in FIGURE 9, the rear connector hooks 64 are rearwardly turned, whereas the forward hook is downturned. Thus, any tendency for an upward movement of the cover 22 is resisted by the rearward hooks 64 engaging the upper side wall 54 of the socket elements 49b and 49c and any tendency of the cover 22 to move forwardly is resisted by engagement of the forward hook 64 with the right side wall 53 of the socket element 49a.

To provide a further rigid support of the cover 22, an outboard post support 67 is provided having a base 68 adapted to rest on the shelf 18 and an upper tongue 69 adapted to fit into a downwardly opening socket 70 provided on the enlarged portion 39 of the left side edge flange 28.

The installation of the meat pan support structure 21 is extremely simple. The socket elements 49 are installed suitably on the refrigerator cabinet wall as discussed above. The connector hooks 64 are then suitably inserted into the socket element openings 55 as by firstly installing the rearward hook elements in the rearward socket elements 49b and 49c and then slightly springing the structure downwardly at the forward end thereof to insert the forward hook connector 64 in the socket element 49a.

The post 67 is installed with the tongue 69 received within the socket 70 as shown in FIGURE 4, to provide a rigidifying outboard support of the left front end of the cover. The right front end of the cover is supported by the connector 64 engaging socket 49a; the right rear portion of the cover is supported by the connector hook 64 engaging socket 49c; and the left rear portion of the cover, as well as substantially the entire rearward portion 26 thereof, is supported through the flange 42 by the lower connector hook 64 engaging socket 49b.

The opposite edges 31 of the meat pan 20 are then slid onto the ledges 29 and 34 to the fully inserted position of FIGURE 1. In this position, the cover 22 covers the pan 20 with the ledges 29 and 34 supporting the pan closely subjacent the cover, as shown in FIGURES 4 and 5.

As shown in FIGURE 3, sockets 49d and 49e are provided to establish a second mounting position for structure 21. The socket 49b is used in both positions. When using the lower mounting position, shelf 18 is removed and may be repositioned above the structure 21. In the lower position, post 67 rests on the shelf 17.

The structure 21 may be formed of a suitable material such as plastic. Thus, the structure is extremely simple and economical of construction, while yet providing an improved rigid pan support and covering means.

While I have shown and described one embodiment of my invention, it is to be understood that it is capable of many modifications. Changes, therefore, in the construction and arrangement may be made without departing from the spirit and scope of the invention as defined in the appended claims.

The embodiment of the invention in which an exclusive property or privilege is claimed is defined as follows:

1. In a refrigerator having wall means defining a compartment including a side wall, a structure in said compartment for removably supporting and covering a pan, comprising:

a cover having a side edge and means for removably carrying a subjacent pan;

means defining a plurality of connectors including a plurality of first connecting means on said side wall fixedly spaced apart substantially in a common vertical plane, second connecting means on said cover spaced apart at said side edge removably engaging corresponding first connecting means, and third connecting means spaced from said cover and substantially in a plane defined by said second connecting means removably engaging corresponding first connecting means;

means connecting said third connecting means to said cover at a first position spaced substantially from said side edge for supporting said cover at said position; and means connected to said cover at a second position spaced substantially from said side edge and said first position for supporting said cover at said second position.

2. The refrigerator structure of claim 1 wherein one of said connecting means includes a pair of spaced hook elements turned in mutually perpendicular directions.

3. The refrigerator structure of claim 1 wherein said last-named means includes a support and means for removably connecting said support to said cover at said second position.

4. The refrigerator structure of claim 1 wherein said first connecting means comprises a plurality of sockets disposed at least one each on horizontally spaced vertical lines in said common plane.

5. The refrigerator structure of claim 1 wherein said cover includes a rear edge portion, and said means for connecting said third connecting means to said cover comprises means connecting said third connecting means to substantially the entire rear edge portion.

6. The refrigerator structure of claim 1 wherein said cover includes a front portion and a rear portion, and said second connecting means comprises a first, downturned hook element adjacent said front portion and a second rearwardly turned hook element adjacent said rear portion.

7. The refrigerator structure of claim 1 wherein said cover includes a front portion and a rear portion, said second connecting means comprises a first, downturned hook element adjacent said front portion and a second rearwardly turned hook element adjacent said rear portion, and said third connecting means comprises a rearwardly turned hook element subjacent said second hook element of said second connecting means.

8. The refrigerator structure of claim 1 wherein said cover further includes a second, opposite side edge and said first and second positions are at said second side edge.

9. The refrigerator structure of claim 1 wherein said cover includes a front portion and a rear portion, said second connecting means comprises a first, downturned hook element adjacent said front portion and a second rearwardly turned hook element adjacent said rear portion, said third connecting means comprises a rearwardly turned hook element subjacent said second hook element of said second connecting means, said cover further includes a second, opposite side edge and said first and second positions are at said second side edge, and said last-named means includes a support and means for removably connecting said support to said cover at said second position.

10. In a refrigerator having wall means defining a compartment and including a side wall and means forming at least one shelf in said compartment, a food keeping pan in said compartment, a unitary support and cover structure adapted to slidably carry and cover said food keeping pan, slide means on said support and cover structure for slidably carrying said food keeping pan for horizontal movement parallel to said side wall, connector means for mounting said support and cover structure on said side wall, said connector means including first connecting means on said side wall and second connecting means on said support and cover structure, said first and second connecting means being cooperatively engageable for releasably mounting said support and cover structure in said compartment to permit ready removal of said support and cover structure from said compartment, support means on said support and cover structure extending angularly between said second connecting means and a first position on said support and cover structure spaced from said side wall for providing load carrying support at said first position, and means on said support and cover structure at a second position spaced from said first position and said side wall and extending between said support and cover structure and said means forming a shelf for providing load carrying support at said second position.

References Cited

UNITED STATES PATENTS

| | | | |
|---|---|---|---|
| 2,421,089 | 5/1947 | Smith | 211—153 |
| 2,668,423 | 2/1954 | Petkwitz | 312—116 X |
| 2,697,916 | 12/1954 | Alsing | 312—291 X |
| 2,786,729 | 3/1957 | Fields | 312—270 |
| 3,178,249 | 4/1965 | Willis et al. | 312—270 X |
| 3,196,812 | 7/1965 | Jacques | 108—152 |
| 3,218,016 | 11/1965 | Koreska | 211—153 X |
| 3,266,858 | 8/1966 | Klotz | 312—270 |

DAVID J. WILLIAMOWSKY, *Primary Examiner.*

JAMES T. McCALL, *Examiner.*